July 31, 1956  K. RÜTSCHI  2,756,680
ELECTRIC MOTOR-DRIVEN PUMP
Filed Dec. 11, 1952  2 Sheets-Sheet 1
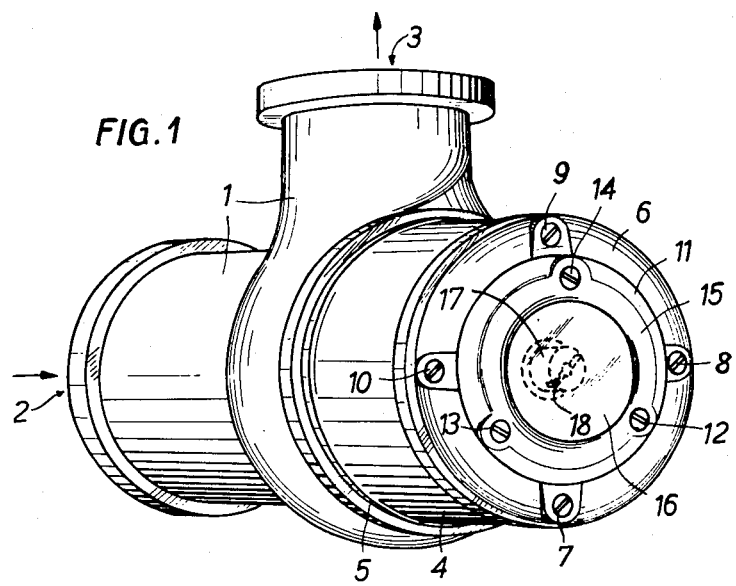
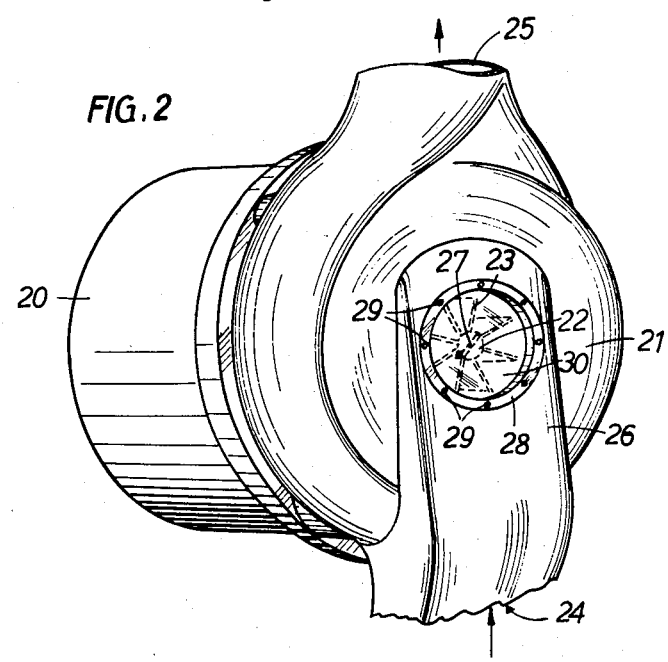
INVENTOR.
KARL RÜTSCHI
BY Leon M. Strauss
AGT.

July 31, 1956     K. RÜTSCHI     2,756,680
ELECTRIC MOTOR-DRIVEN PUMP

Filed Dec. 11, 1952     2 Sheets-Sheet 2

INVENTOR
KARL RÜTSCHI
BY
Pollard Johnston Smyth & Robertson
ATTORNEYS

United States Patent Office 2,756,680
Patented July 31, 1956

2,756,680
ELECTRIC MOTOR-DRIVEN PUMP
Karl Rütschi, Brugg, Switzerland

Application December 11, 1952, Serial No. 325,295

6 Claims. (Cl. 103—87)

The present invention relates to an improvement in pumps driven by electric motors.

It is known in the prior art to actuate rotary pumps or machines serving, for example, to pump liquid, by means of an electric motor, the motor being assembled to the pump in such a way that the common shaft does not project out of the assembly housing. As a result, stuffing boxes are no longer necessary. The motor and pump form a unit and the working medium may enter the motor. Through the elimination of the stuffing box, extensive maintenance work for the latter is avoided. Furthermore, due to the tight housings, leakage is rendered impossible which is especially important when working with poisonous substances. Another problem is that the pump may become stalled because of dirt and must be deblocked, such being difficult in a completely enclosed pump.

An overflow of the medium into the interior of the motor is permissible as long as this medium is oil. As soon, however, as water, vapor or a corrosive substance is to be pumped, the winding of the motor must be protected. This may be done in a known way, for example, by using a watertight winding or by inserting a tube between the stator and the rotor of the motor. In the latter case, the sensitive winding is protected by the tube from any contact with the pumped medium, while the rotor may rotate in the liquid.

As stated above, such assemblies of an electric motor with a rotary pump are well known in the prior art. However, while they have the great advantage of being absolutely tight against leakage of the working medium, they have the great disadvantage that, due to the tight housing, the direction of rotation of the shaft cannot be inspected. It is therefore impossible to determine if the pump is rotating or the direction of said rotation.

An attempt has been made to overcome this disadvantage by measuring the out-put of the machine for different directions of rotation in order to find out if the machine is turning correctly, but this is quite a complicated method.

One of the objects of the present invention is to provide a simple means for observing rotation and direction of rotation and also to provide means to free the pump.

In one aspect of the invention the pump impeller is connected to an electric motor rotor by shaft means, the rotor and impeller being submerged in the liquid being pumped, the shaft having a diametrical slot or the like adjacent one end thereof. A liquid tight enclosure means is provided within which the rotor, shaft and impeller is located. The stator is protected from the liquid being pumped by said enclosure means which will in effect separate the rotor and stator, the enclosure means including a tube, or a water tight winding means, to prevent liquid affecting said stator. The liquid tight enclosure means can have a removable transparent plate adjacent or opposite the end of the shaft having the slot so that shaft rotation and its direction can be observed, the plate being held in fluid tight relationship and being removable for access to the shaft so as to deblock the pump if it becomes blocked and thus stalled.

These and other objects, advantages and features of the invention will become apparent from the following description and drawings.

In the drawings:

Fig. 1 is a perspective view of the motor end of a pump driven by an electric motor;

Fig. 2 shows a perspective view of the pump end of a motor-driven pump;

Figure 3:
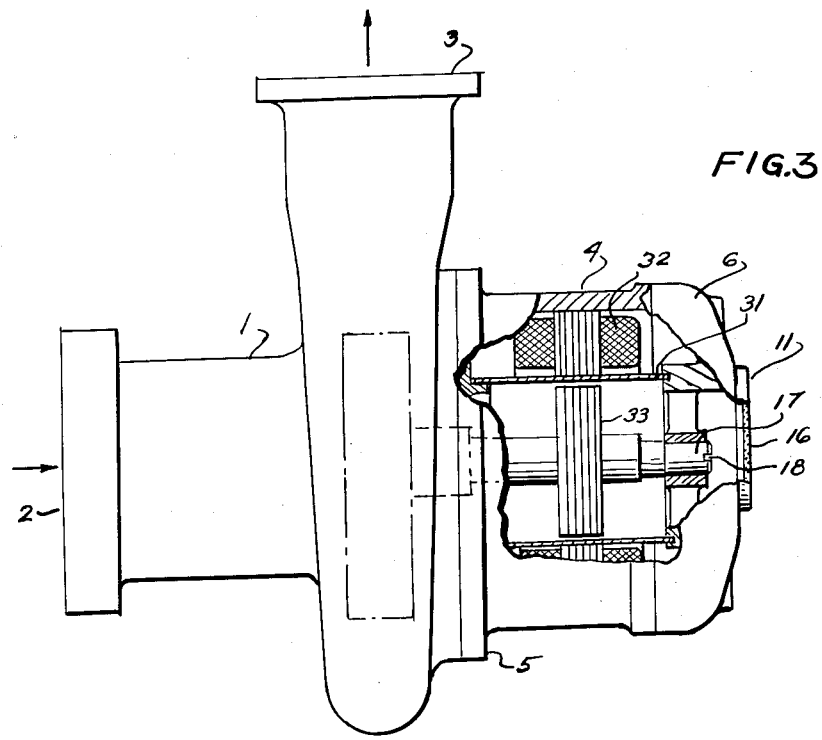
Fig. 3 is a schematic view partially in section of an assembly using a tube.

In Fig. 1, 1 designates the housing of a pump with its inlet opening 2 and outlet opening 3. A second housing 4, entirely surrounding an electric motor is provided with a flange 5 by means of which said housing 4 is tightly secured to the first mentioned housing 1. The end wall 6 of the housing 4, which is opposite to the centrifugal pump, is provided with a central circular aperture. This end wall 6 is secured to the remainder of the housing 4 by means of screws 7, 8, 9, 10. A ring 11 is screwed to said end wall by means of screws 12, 13, 14 and provided with an annular shoulder 15. This shoulder portion of the ring 11 is adapted to receive and hold a circular plate or piece of glass or other transparent material 16 the diameter of which corresponds to that of the annular shoulder 15 and the thickness of which likewise corresponds to or slightly exceeds the depth of the shoulder in the ring 11. The arrangement is such that when the ring 11 is fastened by means of the screws 12, 13, 14 to the end wall 6 of the motor housing 4, the aperture in said end wall is tightly closed, rendering impossible any escaping of pressure liquid, but permitting inspection through due to the glass 16 of the portion directly opposite to the inspection window. The portion of the interior of the housing 4 which may be inspected through the window 16 comprises the end of a shaft 17, which is the shaft of the motor and in the shown embodiment is coaxial to and connected with the shaft of the pump located in the housing 1. The end of the shaft 17 which is visible through the window 16 is provided with a diametrical slot 18, which may be filled with a color different from the front surface of the shaft, permitting an easy inspection of the direction of rotation of 17 with a glance through the window.

In the embodiment illustrated in Fig. 2 the invention is shown in connection with a pump driven by an electric motor. This motor is housed in a housing 20 which is tightly secured to the housing 21 of the pump, shaft 22 of the motor extending through housing 21 of the pump and forming an axle for the impeller 23 of the pump. The pump housing 21 is provided with the usual inlet opening 24 and outlet opening 25. The front wall 26 of the pump housing 21 is provided with a circular aperture situated opposite to the impeller 23 and to the front end of the motor and impeller shaft 22. The latter is provided at its front surface with a diametrical slot 27. The aforementioned aperture in the front wall 26 is tightly closed by an attachment ring 28 secured to said wall 26 by means of screws 29 and tightly pressing against the rim of the aperture of the front wall 26 a circular glass disc 30, thereby forming a window permitting the inspection of the impeller 23. For this purpose the diametrical slot 27 is preferably filled with color facilitating the inspection of the direction of rotation of the shaft 22 and thus of the impeller 23.

The provision of a window opposite to the end of the shaft either at the motor end or at the pump end permits the aforementioned disadvantages of an enclosed assembly to be overcome in a very simple way. At one glance it can be seen whether the motor is running, and if so, it can be ascertained whether the direction of rotation thereof is correct.

Figure 4:
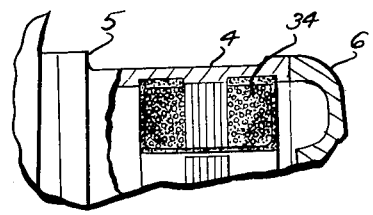
Fig. 4 is a fragmentary sectional view showing a water tight winding instead of a tube.

Fig. 3 is a view partly in section of the form shown in Fig. 1, illustrating an arrangement for a water tight tube 31 separating stator 32 from the rotor 33. The fragmentary view of Fig. 4 shows the tube of Fig. 3 replaced by a water tight winding 34 which can take any desired form.

It should be apparent that details of construction can be changed without departing from the spirit of the invention except as defined in the appended claims.

The provision of a diametrical slot in the shaft simplifies maintenance in that if the shaft becomes blocked and ceases to rotate, by removing screws 7, 8, 9 and 10 or screws 12, 13 and 14 ready access may be had to the machinery. Thereafter rotation of a screw driver inserted in the diametrical slot will clear the obstruction and readily restore service.

Having thus described the invention, what I claim as new and desire to be secured by Letters Patent, is:

1. In combination, a unitary liquid pump and motor device having an electric motor rotor and stator, centrifugal pump impeller means and shaft means connecting said rotor and impeller means, said rotor, impeller means and shaft means being submerged in said liquid, said shaft means being provided with a diametrical slot at one end thereof, liquid tight enclosure means completely enclosing said rotor, impeller means and shaft means, said enclosure means forming a liquid tight seal between said stator and said rotor, impeller means and shaft means, said enclosure means including inlet and outlet pump connections leading to said impeller means, said enclosure means further including a removable transparent plate positioned opposite said diametrical slot of said shaft, and means removably securing said plate in fluid tight relationship with said enclosure means, whereby working conditions of said pump may be visually determined through said plate, removal of said plate providing direct access to said slot of said shaft for turning the latter.

2. A pump and motor device according to claim 1 wherein the diametrical slot is colored for facilitating determination of rotation thereof.

3. In combination, a unitary liquid pump and motor device having an electric motor rotor and stator adjacent one end thereof, centrifugal pump impeller and chamber means adjacent the other end thereof and shaft means connecting said rotor and impeller means, said rotor, impeller means and shaft means being submerged in said liquid, said shaft means being provided with a diametrical slot at the end adjacent said electric motor rotor and stator, liquid tight enclosure means completely enclosing said rotor, impeller means and shaft means, said enclosure means forming a liquid tight seal between said stator and said rotor, impeller means and shaft means, said enclosure means including inlet and outlet pump connections leading to said impeller and chamber means for liquid to be pumped, said enclosure means further including a removable transparent plate positioned opposite said diametrical slot of said shaft adjacent the electric motor end of said enclosure means and visible from the exterior of said pump and motor device, and means removably securing said plate in liquid tight relationship with said enclosure means, whereby working conditions of said pump may be visually determined through said plate, removal of said plate providing direct access to said slot of said shaft for turning the latter.

4. A pump and motor device according to claim 3 wherein the diametrical slot is colored for facilitating determination of rotation thereof.

5. In combination, a unitary liquid pump and motor device having an electric motor rotor and stator adjacent one end thereof, centrifugal pump impeller and chamber means adjacent the other end thereof and shaft means connecting said rotor and impeller means, said rotor, impeller means and shaft means being submerged in said liquid, said shaft means being provided with a diametrical slot at one end at the impeller means end thereof, liquid tight enclosure means completely enclosing said rotor, impeller means and shaft means, said enclosure means forming a liquid tight seal between said stator and said rotor, impeller means and shaft means, said enclosure means including inlet and outlet pump connections for leading liquid to said impeller means, said enclosure means further including a removable transparent plate positioned opposite said diametrical slot of said shaft adjacent the impeller means end of said enclosure means and visible from the exterior of said pump and motor device, and means removably securing said plate in liquid tight relationship with said enclosure means, whereby working conditions of said pump may be visually determined through said plate, removal of said plate providing direct access to said slot of said shaft for turning the latter.

6. A pump and motor device according to claim 5 wherein the diametrical slot is colored for facilitating determination of rotation thereof.

References Cited in the file of this patent

UNITED STATES PATENTS

| 1,184,574 | Schlesinger | May 23, 1916 |
| 1,722,740 | Fulton | July 30, 1929 |
| 1,905,059 | Riebel | Apr. 25, 1933 |
| 2,158,717 | Brock | May 16, 1939 |
| 2,236,937 | Clark | Apr. 1, 1941 |
| 2,517,233 | Peters | Aug. 1, 1950 |
| 2,544,813 | Wall | Mar. 13, 1951 |

FOREIGN PATENTS

| 683,045 | Great Britain | Nov. 19, 1952 |
| 770,671 | France | July 2, 1934 |
| 838,398 | Germany | May 15, 1952 |